Figures 1, 2:
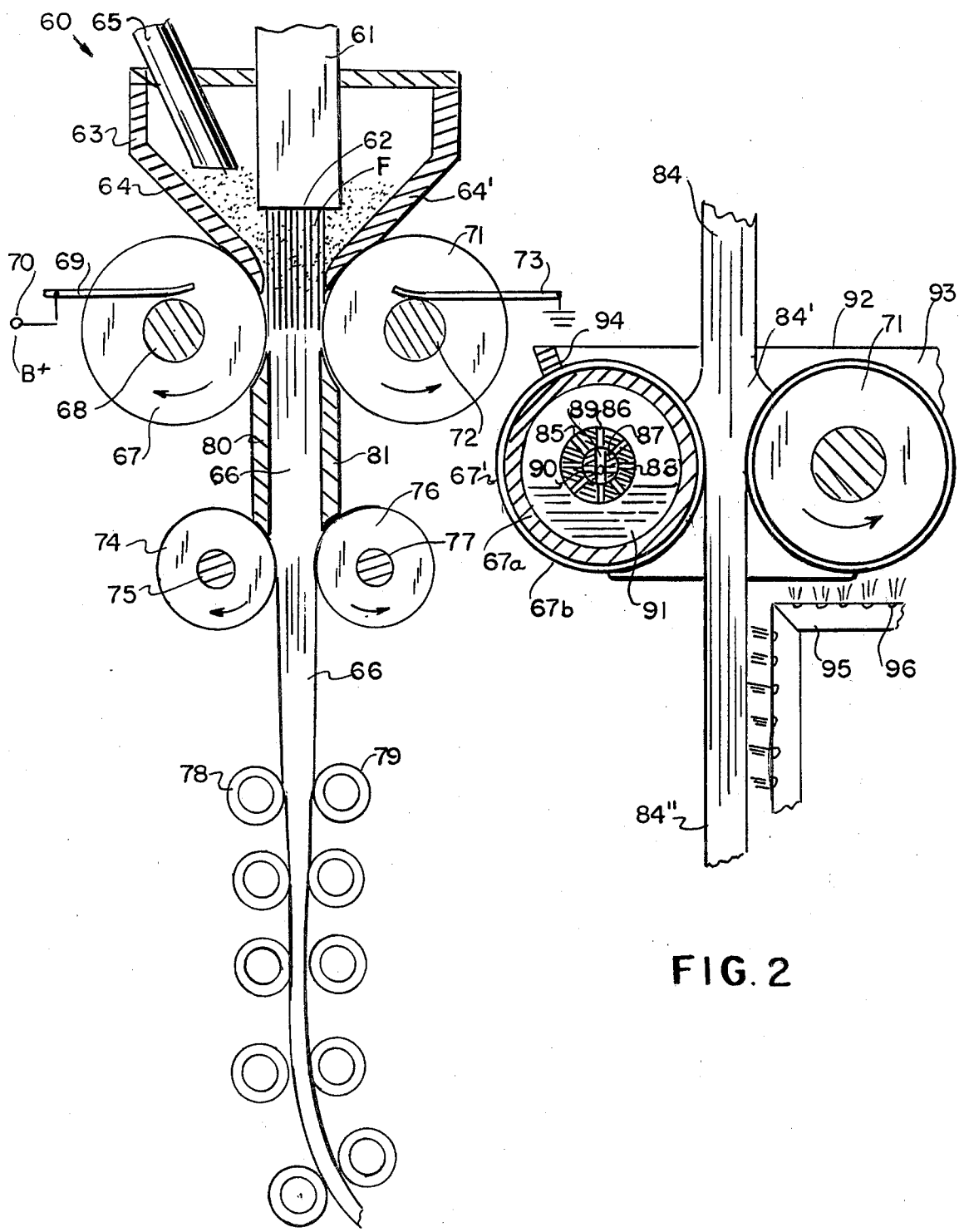

United States Patent [19] [11] 4,335,494
Lemelson [45] Jun. 22, 1982

[54] METHOD OF ROLL FORMING A COMPOSITE

[76] Inventor: Jerome H. Lemelson, 85 Rector St., Metuchen, N.J. 08840

[21] Appl. No.: 30,340

[22] Filed: Apr. 16, 1979

Related U.S. Application Data

[63] Continuation-in-part of Ser. No. 783,988, Apr. 4, 1977, abandoned, which is a continuation-in-part of Ser. No. 587,346, Jun. 16, 1975, abandoned, which is a continuation-in-part of Ser. No. 184,044, Sep. 27, 1971, Pat. No. 3,889,348, which is a continuation-in-part of Ser. No. 814,885, Mar. 27, 1969, Pat. No. 3,608,183, which is a continuation-in-part of Ser. No. 573,148, Jul. 26, 1966, Pat. No. 3,437,783.

[51] Int. Cl.³ ............................................. B23P 15/00
[52] U.S. Cl. .................................................... 29/420.5
[58] Field of Search ................. 228/176; 29/419, 420, 29/420.5; 75/200, 216, 226; 164/80, 82, 50, 52, 250, 252, 428; 264/111

[56] References Cited

U.S. PATENT DOCUMENTS

| | | | |
|---|---|---|---|
| 2,058,448 | 10/1936 | Hazelett | 164/428 X |
| 2,222,251 | 11/1940 | Calkins et al. | 29/420.5 X |
| 2,234,127 | 3/1944 | Mautsch | 29/419 X |
| 2,692,411 | 10/1954 | Brennan | 164/86 X |
| 2,906,596 | 9/1959 | Ballhausen | 75/226 |
| 2,938,821 | 5/1960 | Nack | 65/3 B X |
| 2,976,177 | 3/1961 | Warthen | 65/3 B X |
| 2,992,517 | 7/1961 | Hichs, Jr. | 65/11 R X |
| 3,122,434 | 2/1964 | Reed et al. | 75/214 |
| 3,270,409 | 9/1966 | Grant | 29/420.5 |
| 3,328,139 | 6/1967 | Hodge et al. | 75/214 X |
| 3,331,684 | 7/1967 | Stordheim | 75/214 X |
| 3,340,052 | 9/1967 | Inove | 75/201 |
| 3,389,455 | 6/1968 | Clark | 29/420 X |
| 3,406,737 | 10/1968 | Dutlot et al. | 164/86 |
| 3,608,183 | 9/1971 | Lemelson | 29/419 X |
| 3,889,348 | 6/1975 | Lemelson | 29/419 X |

Primary Examiner—Gil Weidenfeld
Assistant Examiner—K. J. Ramsey

[57] ABSTRACT

An apparatus and method are provided for forming elongated solid shapes from solid flowable materials such as metal powders, metal shot, fragments or segments of metal in a weldable condition by continuously feeding same to die means which includes two or more power rotated rolls or rollers between which the flowable material is fed and compressed to define its shape. In one form the flowable material or particles may be cold pressured welded into the shape defined by the surfaces of the rolls and their spacing. In another form, heat may be generated within or transferred to the material between the rolls by induction or resistence heating means disposed within or adjacent to the rolls, wherein the heat and the high pressure applied to the material by the rolls serves to fuse or weld the material fed therebetween into a solid porous or non-porous mass as it is fed through the rolls. Heat generated within the compressed material by the compressive force of the rolls thereon may also serve to fuse the material into a solid porous or non-porous mass.

2 Claims, 2 Drawing Figures

U.S. Patent

Jun. 22, 1982

4,335,494

METHOD OF ROLL FORMING A COMPOSITE

RELATED APPLICATIONS

This is a continuation-in-part of Ser No. 783,988 filed Apr. 4, 1977 now abandoned, as a continuation-in-part of Ser. No. 587,346 filed June 16, 1975 for Apparatus and Method for Producing Composite Material, abandoned, which was a continuation-in-part of Ser. No. 184,044 filed Sept. 27, 1971 now U.S. Pat. No. 3,889,348, a continuation-in-part of Ser. No. 814,885 filed Mar. 27 1969, now U.S. Pat. No. 3,608,183 which was a continuation-in-part of Ser. No. 573,148 filed July 26, 1966 now U.S. Pat. No. 3,437,783.

SUMMARY OF THE INVENTION

This invention relates to an apparatus and method for forming elongated shapes on a continuous basis by continuously flowing a weldable material in a solid particle or fragmentary shape to a die in the form of two or more rolls which compress and form a structural shape thereof. The process may include working the first shape by drawing same from the die or mold and performing one or more operations thereon.

Depending on the exact structure of the apparatus, it may be utilized to form such composite materials as metal with reinforcing filaments extending therethrough along the length of the final shape, ceramic materials containing reinforcing elements or plastic polymers containing reinforcing filaments.

It is known in the art to provide fiber reinforced articles or shapes by winding or blowing filaments against a preform containing a resin binder. Such a process is not only limited to certain combinations of materials such as thermosetting resins and filaments or roving fed from coiled supplies thereof but the configurations produced are generally limited to the shape of the particular preform, a body of revolution, and the type of filament winding apparatus which is employed.

By means of the instant invention, a variety of composite materials may be produced in solid cross-section of a variety of different components including metals, ceramics, polymers and glass, on a continuous basis by casting or extruding respective portions of the composite material, passing same between rotating dies or through a die throat to form a first shape thereof and thereafter working the composite shape so formed into a second shape having predetermined and improved physical characteristics.

Accordingly, it is a primary object of this invention to provide a new and improved apparatus and method for forming composite articles and material.

Another object is to provide an apparatus and method for continuously forming a composite material of a matrix material surrounding and encapsulating a plurality of reinforcing elements, such as filaments, which are continuously formed or fed from a supply thereof to a continuous forming means such as a die or mold or a plurality of cooperating die forming rollers.

Another object is to provide an apparatus and method for forming filaments of a weldable material such as metal and feeding said filaments between electrically energized dies which compress and weld the filaments together simultaneously as they serve to form and combine a matrix or encapsulating material for the filaments.

Another object is to provide an apparatus and method for forming structural shapes from a molten material by continuously casting and forming the casting to shape immediately after it is cast.

Another object is to provide new and improved composite structures made of filaments or whiskers of metal and matrix materials encapsulating same such as metals or non-metals.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a side view with parts broken away for clarity of an apparatus for continuously producing structural members of composite materials, and FIG. 2 is a side view in partial cross-section of a modified form of the apparatus illustrated in FIG. 1.

In FIG. 1 there is shown an apparatus for continuously producing materials of the type described. The apparatus 60 includes a first means 61 for continuously supplying filaments as described and feeding same downwardly into a recepticle or hopper 63. The supply means 61 may comprise a nozzle terminating a system for feeding stored filaments or the terminal head or die of an extrusion machine operative to continuously extrude a plurality of freshly formed metal or plastic filaments F from a plurality of orifices at the end 62 thereof. The supply head 61 may be rotated, moved back and forth across the hopper 63 or otherwise moved to distribute the filaments or may remain stationary to feed plural parallel filaments to the hopper 63 for processing beyond the open lower end thereof. One or more further feeding means 65 may be disposed to feed particulate or liquid material as described to the hopper 63 adjacent feed means 61 to be combined with the filaments as described. The means for supplying material to the feed heads 61 and 65 may be automatically controlled to assure that the correct amount of each material is fed to the hopper.

Below hopper 63 are located two or more rotating drum dies 67 and 71 each of which rotates against the material fed therebetween in the directions of the arrows to compress and weld said filaments as described. The sidewalls 64 and 64' of hopper 63 may ride just above or against the surfaces of the drum dies 67 and 71 to effect a seal therewith. The material fed to the open end of hopper 63 passes between and is compressed between drums 67 and 71 and is driven thereby in a downwardly direction to define a sheet or other formation 66 as defined by the surface shape of the drums.

Drums 67 and 71 rotate on respective shafts 68 and 72 which are power rotated by means not shown at the same speed. Electrical energy for resistance welding is conducted to roller or drum 67 as it rotates by the engagement of a brush 69 against the shaft 68, the brush being connected to a source 70 of sufficient electrical potential. Drum 71 may be grounded per se or by means of a brush element 73 slidably engaging the shaft 72 thereof, the brush being grounded.

Rotationally mounted below rollers 67 and 71 are a plurality of rollers or drums 74 and 76 which may serve to further compress formation 66 therebetween and/or to further process same by welding or adding heat thereto to provide a second formation 66' which is guided by further powered rollers in a predetermined path such as the illustrated horizontal path away from the forming apparatus illustrated for further processing such as forming or cutting member 66' to lengths. Rollers 78,79 may also be heated or electrically energized to perform operations on the downstream portion 66' of the material processed above.

Notations 80,81 refer to devices disposed between drums 67,71 and 74,76 for guiding, confining and/or otherwise processing material 66 fed therebetween. If part of the material comprising formation 66 is molten or semi-molten, members 80,81 may serve as guides or a conduit for preventing flow of said molten material out of the formation 66. In such function, the walls 80,81 may slidably engage the upper and lower drums. Heat may also be conducted or radiated to formation 66 through or from devices 80,81 which may be electrically or otherwise heated or contain one or more heat sources.

It is noted that the apparatus of FIG. 1 may be used in the form shown or modified to process a variety of materials into sheet or panel form or any suitable shape. For example, molten metal, plastic or ceramic material may be continuously fed from head 61 downwardly between drums or rollers 67,71 to be continuously shaped therebetween so as to provide, by the time formation 66 is defined as a result of at least partial solidification of the material, a shape which substantially conforms to the shape defined by the surfaces of rollers or drums 67,71. The material 66 may be used per se or further reduced in cross section and/or changed in shape by one or more groups of lower drums or rollers such as 78 and 79. If a reduction in cross section is effected by the lower pairs or series of rollers are corresponding shaped and operate to compress and roll shape member or formation 66 into a new formation such as 66' which may be further changed in shape by other cooperating rollers or drums situated therebeyond as shown. The rotational speed of each group or pair of rollers is preferably automatically controlled by closed loop control means employing feedback signal generating means measuring the speed of the material being shaped or rolled and the forces applied to the rollers, so as to maintain the proper or predetermined relations between the various variables of the process.

One or more of the illustrated groups of rollers or drums may also be cooled with fluid and/or electrical cooling means so as to increase the transfer of heat from the material to solidify portion 66 or 66' more rapidly.

In one form of application of the apparatus of FIG. 1, high strength whisker elements or filaments of any suitable metal, ceramic, plastic or glass may be formed continuously in apparatus having head 61 as a distribution means therefore, which filaments are directly fed into a molten metal, plastic or glass fed continuously into open bottom container 63 so that the resulting formation 66 comprises the solidified molten material which is internally reinforced with the filaments formed in apparatus 61. Filaments or whiskers of boron nitride, silicon carbide, aluminum oxide, titanium carbide, etc. may be continuously formed or provided from a formed supply thereof as a steady flow of filaments in parallel or random array of any desired density into molten metal, ceramic or other material fed to hopper 63 so that, not only is the shape of the molten material predetermined by the operation of the rollers but the location and density of reinforcing filaments is also predetermined.

Liquid, powdered or pelletized metal such as aluminum, steel or other metal may also be fed to hopper 63 as formed or from a supply thereof and rolled or cast to shape as defined by the illustrated rollers. The rolls situated beyond the location where the material solidifies may also be utilized to draw shape the feeding formation to a desired shape and to predeterminately control the grain or molecular structure of the material being shaped by stressing and rolling same.

Material feed head 65 may comprise a tube, nozzle, pour spout or extrusion head and die operable to introduce one or more materials therefrom into the hopper chamber. The materials so introduced may be mixed with the material extruded from head 61 by gravity flow or by being forced under pressure from nozzle or extrusion die 65 into the chamber defined by the hopper to fill the interstices between the filaments F to form a composite casting of the two materials. Such mixing may be enhanced if the head 61 is rotated and/or oscillated back and forth as material is flowed therefrom and from nozzle or die 65. The material flowed from nozzle 65 may also comprise a powdered metal, ceramic or plastic depending on the material expressed from head 61 and the desired composite material to be formed. Head 65 may also be disposed concentric with head 61 or axially aligned therewith to provide surrounding or adjacen materials.

There is shown in FIG. 2 a modified form of the apparatus of FIG. 1 and details of means for transferring heat from the rollers between which material is extruded or cast as described. The apparatus of FIG. 2 includes means, not shown, such as an extruder or other source of molten or semi-molten material 84 operative to provide said material as a steady stream in a downward direction to distribute same above and between two power-driven rotating drums or rollers 67' and 71' for performing the functions of shaping, at least partially solidifying and downwardly driving an elongated formation 84'' of the material 84 fed therebetween. Roller 67' is power rotated in a clockwise direction and 71' in a counterclockwise direction as indicated by the arrows. Notation 84' refers to a puddle of the molten material 84 disposed immediately above the rollers which supplies molten material to shape the upper end of the downwardly moving configuration 84'' the shape of which is determined by the surface shape and spacing of the rollers 67' and 71'. The rate of flow of material 84 to the mass 84' is therefore predeterminately controlled in accordance with the temperature and characteristics of the material being cast or rolled to shape and upon such other variables as the rate of heat transfer from the material, the velocity of formation 84'', etc. The rollers 67' and 71' preferably rotate whereby the outer surfaces of each are travelling at a velocity equivalent to the velocity of the solidified member 84''.

The material 84 fed to the upper surfaces of the rollers may comprise molten or semi-molten metal fed by gravity, molten or semi-molten ceramic materials fed by gravity or molten or semi-molten polymers also fed by gravity. The material 84 may also be extruded to the bite of the oppositely rotating rollers 67' and 71' as a single billet, a plurality of filaments as described or other suitable shape of shapes. Said material 84 may also comprise pelletized or particulated material of the type described.

If the material 84 is molten, it may be confined to a volume between rollers 67' and 71' by properly shaping the end portions of each roller to engage each other and/or by means of a container 92 having side walls 93 and end walls 94 slidably engaging the ends of the rollers and the surfaces of the rollers to provide a seal therewith particularly in alignment with the reservoir 84' of casting material so as to prevent said material from flowing sideways off the rolls. Such container may be replaced by plates such as the end walls 93 thereof which are spring loaded to compress against the end faces of rollers 67' and 71' to provide such a seal and preventing lateral flow of casting material beyond the rolls.

If the material being cast between the rollers is molten or semi-molten metal provided at temperatures between 1000° and 3000° F. both the confining container or end plates 93 and the rollers 67' and 71' may be made of, clad or coated with, high-temperature resistant materials such as molybdenum, molybdenum alloys, tungsten, tungsten alloys, various high temperature ceramic materials such as tungsten carbide, titanium carbide, aluminum oxide or the like.

Drum 67' is shown in cross section as comprising a cylindrical wall 67a made of metal such as maraging steel which is clad or coated with a high temperature oxidation-resistant material 67b as described which serves to prevent heat corrosion thereto.

Roller 67' is cooled during its operation by providing a hollow shaft 85 having radial holes 86 therein and rotating on an inner shaft 87 having passageways 89 and 90 communicating with the passageways 86 in the outer shaft 85 through a plurality of holes 88 disposed radially in the wall of the inner shaft. Passageway 90 is operative to provide a coolant fluid such as water under pressure which flows through radial holes 88 in the wall of the inner shaft and through the radial holes 86 in the wall of the outer shaft 85 when said holes come into alignment with each other and provides a pulsating spray against the inside surface of the cylindrical wall of roller 67' for cooling same. Passageway 89 in inner shaft 87 is connected to a pump and is operative to receive water and/or steam provided in volume 91 after heat has been transferred thereto so as to rapidly remove same from volume 91 to permit the rapid cooling of the roller and thereby the rapid solidification of the casting material.

Also provided in FIG. 2 is a conduit 95 containing a plurality of openings 96 therein for spraying heat transfer fluid such as water against the down stream side of the roller 71' and the surface of cast member 84" to rapidly cool same.

Material to be combined with that provided originally as shape 84 may be injected, gravity fed or power driven directly into the puddle formation 84' prior to compression of the mass between rollers 67' and 71'. Said additive material may be in the form of molten material, particulate material, pellets, filaments, whiskers or otherwise shaped material.

The downwardly moving shape 84" may be immediately fed between further power driven rollers as described to reduce or change its cross section and/or to draw same into one or more further shapes of cross section less than that of 84". By providing a mandrel between rollers 67' and 71' which mandrel is supported from above said rollers, tubular shapes may also be formed between the peripheral surfaces of the rollers which surfaces may be of regular or irregular configurations to define flat, curved or irregular surface shapes for member 84".

Apparatus of the type illustrated in FIGS. 1 and 2 has particular advantage over conventional continuous casting apparatus in which an elongated shape is downwardly cast through an open mold or die which is subject to rapid erosion caused by movement of the shape being cast. The drums or rollers provided in FIGS. 1 and 2 are in constant rotation, preferably in a manner such that the surface velocities of the drums and the shape 84" are substantially the same so as to provide a minimum degree of erosion to the surfaces of the rollers. By providing adjustable means for the shafts on which said rollers rotate to take up for any wear, such a continuous casting or rolling process may be operated for long periods of time without replacement of the rollers resulting in substantially less down-time than would be experienced employing conventional continuous casting dies or molds.

By drawing the material formations 66' or 84" immediately after they are roll formed or cast, improved process is provided whereby structural members may be drawn to shape without the need for reheating billets, slabs, or tubes of material as is the conventional practice is drawing shapes of metal.

Variations in the apparatus and methods for forming composite materials which are illustrated in FIGS. 1 and 2 include the following:

I. The filaments F which are fed downwardly from supply means 61 may be continuously formed therein or remote therefrom by extrusion, spinning or other suitable means and may include such materials as high strength thermoplastic or thermosetting polymers, glass filaments, metal whiskers of high strength, high strength carbon filaments formed by continuously carbonizing and treating filaments formed of polymeric materials, graphite filaments or wires formed of metals or ceramic materials. These filaments or whiskers may be continuously formed in the device 61 along a production line extending substantially outwardly from the end portion of the device illustrated in the drawing or may be fed from a coil supply thereof downwardly into the hopper 63 and in a manner such that the matrix or filler material supplied to the hopper from supply means 65 will combine and surround the array of filaments or each individual filament by virtue of gravity or forced flow thereof. In a modified form of the invention, the hopper 64 may be enclosed and molten or particulate material fed from device 65 may be supplied under pressure to the enclosed hopper so as to infiltrate the volumes between the filaments F as they are fed between the rolls 67 and 71.

II. The filaments F may comprise glass fibers while the material fed from device 65 may comprise a thermosetting resin such as a polyester, polyamide, epoxy or other suitable resin and may be gravity flowed or flowed under pressure around and infiltrating the array of filaments.

III. If the material fed from the supply means 65 comprises metal powder or a combination of metal and ceramic powders, the metal thereof may be heated to a molten or scintering condition by the heat generated in metal filaments fed from supply means 61 when resistively heated as described, thereby forming a solid composite material when the composite is drawn by the operation of cooperating rollers 74, 76, 78 79, etc.

In the apparatus illustrated in FIG. 2, short filaments may be continuously supplied to the molten metal in the region denoted 84' above the powered rolls for reinforcing the composite casting 84'' which is formed beneath the casting rolls.

IV. Power operated cooperating drive and forming rolls of the type illustrated in FIG. 1 may be provided to receive the casting 84'' and drive same in a manner to predeterminately work and reduce the cross-section thereof to form a predetermined structural shape of the casting material.

In another form of the invention, the plurality of rollers provided for forming and driving the material cast or compression formed therebetween may be replaced by a pair of aligned and opposed belt conveyors having endless belts of stainless steel sheet or other suitable material which belts are drivable about a plurality of powered rollers or drums to locate them a desired degree apart to permit the shapes described to be continuously cast therebetween. The belts may be compressed together by smaller rolls disposed on both sides of the abutted belts.

As employed herein the term "particles" when used to define the material fed between the roller dies 67 and 71 of FIG. 1 may define one or more fluent materials such as powdered metal, metal shot, small fragments or segments of metal or the like which may be continuously fed and delivered to the bite of said roller dies or rolls 67 and 71 in a manner to form a solid non-porous or porous shape thereof beyond said rolls by both the compressive action of the rolls and the heat generated within said material by electrical resistance or induction generated heat generated by suitable induction means within or adjacent to the rolls. Such materials may be fed with or without the described reinforcing filamentary materials to the powered rolls 67 and 71. Rolls 74 and 76 may also contain resistance or induction heating means supported therein or adjacent thereto for heating the material fed therebetween.

If the material fed between rolls 67 and 71 is capable of being axially oriented to improve its structure, rolls 74 and 76 as well as rolls 78 and 79 may be controllably operated in such a manner as to axially orient the material fed therebetween by pulling and stretching same.

In a particular form of the invention, particulate material such as powdered or otherwise shaped aluminum may be flowed to the bite of the roller dies of FIG. 1 in a manner to completely fill the spacing therebetween wherein the heat and pressure generated while such material is disposed between the dies is sufficient to roll bond or weld the particles together either into a solid porous or non-porous elongated shape as described.

I claim:

1. A method for continuously shaping a weldable metal into a elongated member of substantially constant cross section comprising:

continuously feeding a heat and pressure weldable metal in a flowable particulate condition to die means which is operable to compress material fed through said die means and wherein such feeding is at such a flow rate to completely fill said die means as said weldable metal is feed therethrough, compressing and resistance heating said weldable metal particles while in said die means so as to effect the fusion of said particles as they pass through said die means and the simultaneous welding of said particles into a non-porous solid mass while said metal is located within said die means so as to form a solid elongated shape defined by the shape of said die means, and applying a driving force to said die means and the metal shaped thereby to cause the continuous formation of said non-porous solid shape and its movement out of and away from said die means to define said elongated member.

2. A method for continuously shaping a weldable metal into a elongated member of substantially constant cross section comprising:

continuously feeding a heat and pressure weldable metal in a flowable particulate condition to a die means which is operable to compress material fed through said die means and wherein such feeding is at such a flow rate to completely fill said die means as said weldable metal is fed therethrough, compressing and resistance heating said die means and transferring the heat generated through said die means to said weldable metal particles so as to heat and weld said metal particles while in said die means and to effect the fusion of said particles as they pass through said die means into a non-porous solid mass while said metal is located within said die means and to form a solid elongated shape defined by the shape of said die means, and applying a driving force to said die means and the metal shaped thereby to cause the continuous formation of said non-porous solid shape and its movement out of away from said die means to define said elongated member.

* * * * *